US010706799B2

(12) United States Patent
Chen et al.

(10) Patent No.: US 10,706,799 B2
(45) Date of Patent: Jul. 7, 2020

(54) DISPLAY DEVICE WITHOUT A DRIVER IC

(71) Applicant: AU Optronics Corporation, Hsinchu (TW)

(72) Inventors: Yung-Chih Chen, Hsinchu (TW); Cheng-Han Huang, Hsinchu (TW); Wei-Hsuan Chang, Hsinchu (TW); Chun-Da Tu, Hsinchu (TW)

(73) Assignee: AU OPTRONICS CORPORATION, Hsinchu (TW)

( * ) Notice: Subject to any disclaimer, the term of this patent is extended or adjusted under 35 U.S.C. 154(b) by 135 days.

(21) Appl. No.: 15/832,933

(22) Filed: Dec. 6, 2017

(65) Prior Publication Data

US 2019/0172407 A1    Jun. 6, 2019

(51) Int. Cl.
*G09G 3/36* (2006.01)
*G02F 1/1368* (2006.01)
*G02F 1/1345* (2006.01)
*G02F 1/1333* (2006.01)

(52) U.S. Cl.
CPC ......... *G09G 3/3648* (2013.01); *G02F 1/1368* (2013.01); *G02F 1/13452* (2013.01); *G09G 3/3611* (2013.01); *G02F 2001/133302* (2013.01); *G09G 2300/0452* (2013.01); *G09G 2310/0286* (2013.01)

(58) Field of Classification Search
None
See application file for complete search history.

(56) References Cited

U.S. PATENT DOCUMENTS 6,002,385 A * 12/1999 Silverbrook ......... G09G 3/3607
345/100
6,147,667 A * 11/2000 Yamazaki ........... G02F 1/13454
345/92
6,335,778 B1 * 1/2002 Kubota ................ G09G 3/3648
349/151

(Continued)

OTHER PUBLICATIONS

International Search Report and Written Opinion dated Mar. 6, 2019 in international patent application No. PCT/CN2018/119577 (9 pages).

(Continued)

*Primary Examiner* — Patrick N Edouard
*Assistant Examiner* — Peijie Shen
(74) *Attorney, Agent, or Firm* — Ware, Fressola, Maguire & Barber LLP

(57) ABSTRACT

A display device has a substrate for disposing a display area having an array of pixels, and control circuits having shift registers and latches to provide image data and timing control signals to the pixels. The control circuits have signal lines electrically connected to a connection cable to receive therefrom data signals indicative of the image data and timing pulses indicative of the timing control signals. The connection cable is also configured to provide reference signals to the shift registers and latches in the control circuits. The data signals are digital signals having an amplitude range greater than the amplitude range of the reference signals. No driver IC is disposed on the substrate to process analog signals. Each of the pixels has three sub-pixels and each of the color sub-pixels has three color sub-areas configured to receive timing control signals from a different scan line.

20 Claims, 9 Drawing Sheets

(56) References Cited

U.S. PATENT DOCUMENTS

| | | | | |
|---|---|---|---|---|
| 9,311,892 B2* | 4/2016 | Zhang | | G02F 1/167 |
| 2002/0047822 A1* | 4/2002 | Senda | | G09G 3/32 |
| | | | | 345/90 |
| 2002/0167477 A1* | 11/2002 | Tsutsui | | G09G 3/3648 |
| | | | | 345/89 |
| 2003/0011555 A1* | 1/2003 | Fukami | | G09G 3/3648 |
| | | | | 345/94 |
| 2004/0008172 A1* | 1/2004 | Nakamura | | G06F 3/0412 |
| | | | | 345/89 |
| 2004/0196235 A1* | 10/2004 | Koyama | | G09G 3/3607 |
| | | | | 345/89 |
| 2006/0125758 A1* | 6/2006 | Yamamura | | G09G 3/2085 |
| | | | | 345/98 |
| 2006/0203604 A1* | 9/2006 | Park | | G09G 3/3648 |
| | | | | 365/185.23 |
| 2007/0013573 A1* | 1/2007 | Hashimoto | | G09G 3/3614 |
| | | | | 341/172 |
| 2007/0097046 A1* | 5/2007 | Choi | | G09G 3/20 |
| | | | | 345/82 |
| 2007/0146615 A1* | 6/2007 | Komori | | G02F 1/13452 |
| | | | | 349/151 |
| 2007/0222737 A1* | 9/2007 | Kimura | | G09G 3/3266 |
| | | | | 345/100 |
| 2007/0279344 A1* | 12/2007 | Kimura | | G09G 3/2022 |
| | | | | 345/77 |
| 2008/0284710 A1* | 11/2008 | Kimura | | H01L 27/1218 |
| | | | | 345/98 |
| 2009/0153759 A1* | 6/2009 | Um | | G09G 3/3651 |
| | | | | 349/39 |
| 2010/0123738 A1* | 5/2010 | Matsukawa | | G09G 3/3648 |
| | | | | 345/690 |
| 2010/0164925 A1* | 7/2010 | Weng | | G09G 3/3614 |
| | | | | 345/211 |
| 2010/0277458 A1* | 11/2010 | Liu | | G09G 3/3688 |
| | | | | 345/211 |
| 2012/0062526 A1* | 3/2012 | Wen | | G09G 3/3648 |
| | | | | 345/204 |
| 2012/0194500 A1* | 8/2012 | Yen | | G09G 3/3688 |
| | | | | 345/212 |
| 2013/0229403 A1* | 9/2013 | Teranishi | | G09G 3/3607 |
| | | | | 345/212 |
| 2013/0241974 A1* | 9/2013 | Teranishi | | G09G 3/3207 |
| | | | | 345/691 |
| 2014/0015866 A1* | 1/2014 | Teranishi | | G09G 3/2007 |
| | | | | 345/690 |
| 2014/0285761 A1* | 9/2014 | Tamaki | | G09G 3/2074 |
| | | | | 349/144 |
| 2015/0042550 A1* | 2/2015 | Wang | | G02F 1/1309 |
| | | | | 345/98 |
| 2015/0162393 A1* | 6/2015 | Kang | | G01R 31/2635 |
| | | | | 324/762.07 |
| 2018/0122286 A1* | 5/2018 | Wu | | G09G 3/3275 |
| 2018/0374405 A1* | 12/2018 | Li | | G09G 3/006 |

OTHER PUBLICATIONS

William den Boer, "Active Matrix Liquid Crystal Displays", Elsevier, 2005, 8 pages.

Office Action dated Jan. 20, 2020 in Korean Patent Application No. 10-2018-0155853 (12 pages).

* cited by examiner

DISPLAY DEVICE WITHOUT A DRIVER IC

TECHNICAL FIELD

The present invention relates generally to a display device having a display area with a plurality of pixels arranged in a two-dimensional array.

BACKGROUND OF THE INVENTION

In a display device in which a display area has a plurality of pixels, thin-film transistors (TFTs) are commonly used as switching elements for controlling the charging and discharging in the pixels. At least one driver IC is used to drive the TFT switching elements. A prior art display device is shown in FIG. 1. One of the functions of the driver IC is to receive digital data and transform the digital data into analog signals. Typically the amplitude of the digital data is much smaller than the analog signals. In a liquid crystal display (LCD) panel, the transmission of light through the liquid crystal layer is controlled by an electrical field applied to the liquid crystal layer. The amplitude of the analog signals applied to the pixels, together with the polarizers located on opposite sides of the liquid crystal layer, at least partly controls the brightness levels of the pixels and the gray scale of the display panel. As the image quality of a display device improved, the role of the driver IC becomes more important. In particular, large display panels such as TV screens and computer monitors require a large number of driver ICs.

As shown in FIG. 1, the display device 2 has a substrate 3 for accommodating a display area 4, one or more control circuits 5 and a driver IC 6. The driver IC 6 is configured to receive input signals from a connector, such as a flexible printed circuit (FPC) 7. One of the functions of the driver IC 6 is to provide analog signals indicative of image data to the display area 4, under the control of the control circuit 5. As a driver IC takes up some area of the substrate outside the display area, the substrate must have a border area large enough for the driver ICs.

In smaller display devices, such as personal wearable display devices and information display devices for use on home appliances and office equipment, the image quality is less important. Some of those display devices tend to have a small substrate and the border area outside the display area is relatively small. It would be desirable to eliminate the use of driver ICs in order to minimize the border area.

SUMMARY OF THE INVENTION

The present invention provides a display device without a driver IC. The display device, according to embodiments of the present invention, has a substrate for disposing a display area having an array of pixels, and control circuits having shift registers and latches to provide image data and timing control signals to the pixels. The control circuits have incoming signal lines electrically connected to a connection cable to receive therefrom data signals indicative of the image data and timing pulses indicative of the timing control signals. The connection cable is also configured to provide reference signals to the shift registers and latches in the control circuits. The data signals are digital signals having an amplitude range greater than the amplitude range of the reference signals. Each of the pixels has three sub-pixels and each of the color sub-pixels has three color sub-areas configured to receive timing control signals from a different scan line. No driver IC is disposed on the substrate to process analog signals.

Thus, it is an aspect of the present invention to provide a display device having a substrate and a display area disposed on the substrate, the display area comprising a plurality of pixels arranged in a two-dimensional array, said display device comprising:

a first control circuit disposed on the substrate, the first control circuit comprising a plurality of first incoming signal lines, a plurality of first electronic components, and a plurality of data lines, the data lines arranged to provide image data to the pixels, the first electronic components configured to receive from the first incoming signal lines data signals indicative of the image data;

a second control circuit disposed on the substrate, the second control circuit comprising a plurality of second incoming signal lines, a plurality of second electronic components and a plurality of scan lines, the scan lines arranged to provide timing control signals to the pixels, the second electronic components configured to receive from the second incoming signal lines timing pulses indicative of the timing control signals; and a connecting cable comprising a plurality of first connection lines and a plurality of second connection lines, wherein the first incoming signal lines are electrically connected to the first connection lines to receive the data signals therefrom, and the second incoming signal lines are electrically connected to the second connection lines to receive the timing pulse therefrom, and wherein the data signals are digital signals.

According to an embodiment of the present invention, the first incoming signal lines comprise a data signal line for providing the data signals to the first electronic components.

According to an embodiment of the present invention, each of the pixels comprises a plurality of color sub-pixels, each color sub-pixel arranged to receive the image data from a different one of the data lines, and wherein each color sub-pixel comprises a plurality of color sub-areas, each color sub-area arranged to receive the timing control signals from a different one of the scan lines.

According to an embodiment of the present invention, the data lines comprise a first data line, a second data line and a third data line, and the color sub-pixels comprise a red sub-pixel, a green sub-pixel and a blue sub-pixel, the red sub-pixel comprising a plurality of red sub-areas arranged to receive the image data from the first data line, the green sub-pixel comprising a plurality of green sub-areas arranged in the first direction for receiving image data from the second data line, the blue sub-pixel comprising a plurality of blue sub-areas arranged to receive image data from the third data line.

According to an embodiment of the present invention, the sub-areas in each of the red sub-pixel, the green sub-pixel and the blue sub-pixel comprise a first sub-area, a second sub-area and a third sub-area, wherein the third sub-area is two times larger than the second sub-area and the second sub-area is two times larger than the first sub-area.

According to an embodiment of the present invention, each pixel comprises a plurality of pixel sub-areas, each of the pixel sub-areas arranged to receive the timing control signals from a different scan line, each pixel sub-area comprising a red sub-area, a green sub-area and a blue sub-area.

According to an embodiment of the present invention, the first electronic components comprise a plurality of first shift registers and a plurality of latches configured to control the image data, and wherein the first incoming signal lines comprise a plurality of control signal lines arranged to provide shift clock signals and latch clock signals, the first shift registers configured to provide the data signals to the latches in response to the shift clock signals, the latches configured to provide the image data to the color sub-pixels in response to the latch clock signals.

According to an embodiment of the present invention, the second electronic components comprise a plurality of second shift registers configured to control the timing control signals, the second incoming signal lines arranged to provide shift clock signals, the second shift registers configured to provide the timing pulses to the color sub-areas in response to the shift clock signals.

According to an embodiment of the present invention, the pixels are arranged in a plurality of pixels rows in the first direction and a plurality of pixel columns in the second direction, and wherein each pixel comprises a plurality of pixel sub-areas arranged in the second direction, each of the pixel sub-areas arranged to receive the timing control signals from a different scan line, and wherein each pixel sub-area comprises a plurality of color sub-areas arranged in the first direction, each color sub-area arranged to receive the image data from a different data line.

According to an embodiment of the present invention, the plurality of color sub-areas comprise red sub-areas, green sub-areas and blue sub-areas, and wherein each pixel comprises a plurality of color sub-pixels, including a red sub-pixel having the red sub-areas, a green sub-pixel having the green sub-areas and a blue sub-pixel having the blue sub-areas, and wherein the first electronic components comprise a plurality of first shift registers and a plurality of latches configured to control the image data, and the first incoming signal lines comprise a plurality of control signal lines arranged to provide first shift clock signals and latch clock signals, the first shift registers configured to provide the data signals to the latches in response to the first shift clock signals, the latches configured to provide the image data to the color sub-pixels in response to the latch clock signals.

According to an embodiment of the present invention, the second electronic components comprise a plurality of second shift registers configured to control the timing control signals, the second incoming signal lines arranged to provide second shift clock signals, the second shift registers configured to provide the timing pulses to the color sub-areas in response to the second shift clock signals.

According to an embodiment of the present invention, each of the pixel rows comprises N color sub-pixels, N being a positive integer greater than one, wherein the first electronic components comprise N first shift registers and N latches, wherein the plurality of control signal lines arranged to provide N shift clock signals and N latch clock signals in a row-time period, and wherein each of the timing pulses has a pulse width substantially equal to one row-time period.

According to an embodiment of the present invention, each of the pixel columns comprises M pixel sub-areas, M being a positive integer greater than one, wherein the second electronic components comprise M second shift registers and the second incoming signal lines are arranged to provide M consecutive second shift clock pulses to the M second shift registers in one frame time.

According to an embodiment of the present invention, one frame time is equal to 1/60 of a second.

According to an embodiment of the present invention, the substrate comprises a glass substrate.

According to an embodiment of the present invention, the connecting cable comprises one or more flexible printed circuits arranged to receive the data signals and the timing pulses from a control system.

According to an embodiment of the present invention, the digital signals comprise a first voltage level and a second voltage level, wherein the first voltage level is substantially equal to 10V and the second voltage level is substantially equal to −10V.

According to an embodiment of the present invention, the first electronic components comprise a plurality of first switching elements for controlling the image data, and the second electronic components comprise a plurality of second switching elements for controlling the timing control signals, wherein the first and second switching elements are solely made of thin-film transistors.

According to an embodiment of the present invention, the connecting cable is further configured to provide reference signals to provide a voltage reference to some of the first and second switching elements, wherein the reference signals comprise a signal voltage range between −3V to 6V.

According to an embodiment of the present invention, each of first shift registers and latches comprises a plurality of switching elements made of thin-film transistors.

The present invention will become apparent upon reading the description in conjunction with the drawing figures of FIGS. 2 to 10.

DETAILED DESCRIPTION OF THE INVENTION

In a color display device, pixels are typically arranged in a two-dimensional array and each pixel has a plurality of color sub-pixels in R, G and B. In an embodiment of the present invention, each color sub-pixel is made up of a number of sub-areas of the same color and each sub-area is arranged to display either a "dark" level or a "bright" level, independently of other sub-areas. The signal indicative of the image data provided to each sub-area is expressible in two states, such as "H" and "L". In other words, the data signals indicative of the image data provided to each pixel are digital signals. In an embodiment of the present invention, the data signals are discrete signals carried out in alternate phases. The display device, according to the present invention, comprises control circuits having shift registers and latches configured to control the image data. The control circuits are arranged to receive the data signals directly from a timing control system through a connecting cable. The display device, according to the present invention, does not have a driver IC.

Figure 1:
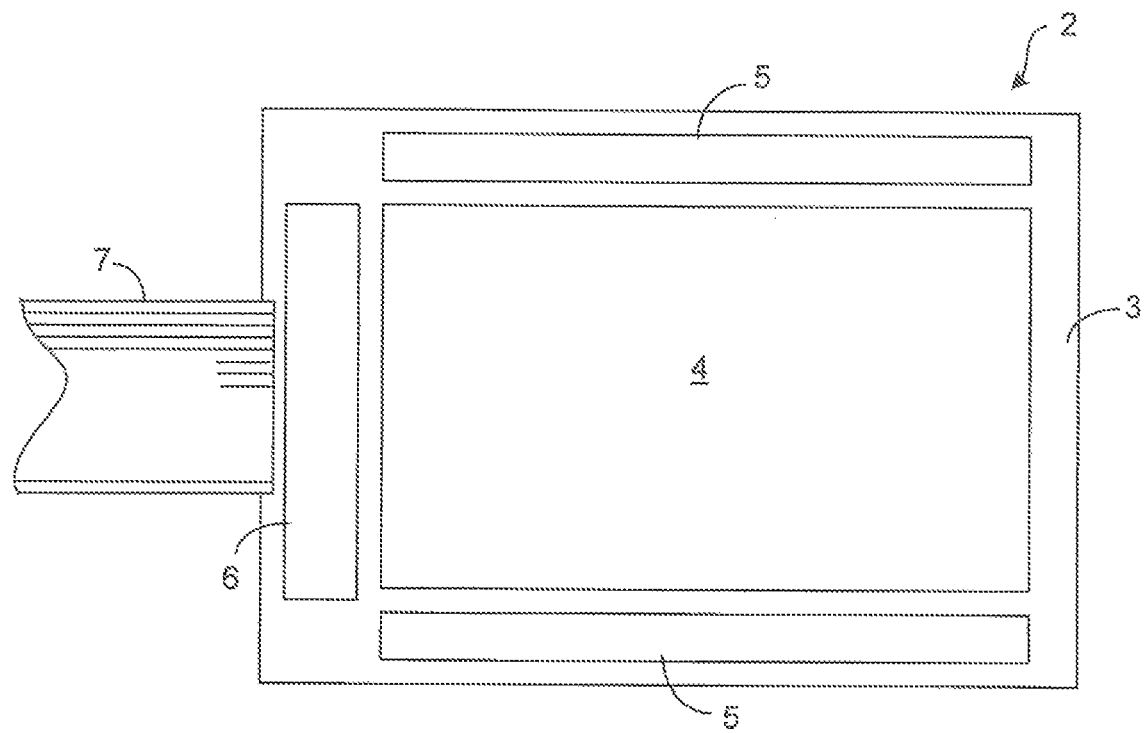
FIG. 1 illustrates a prior art display device.
Figure 2:
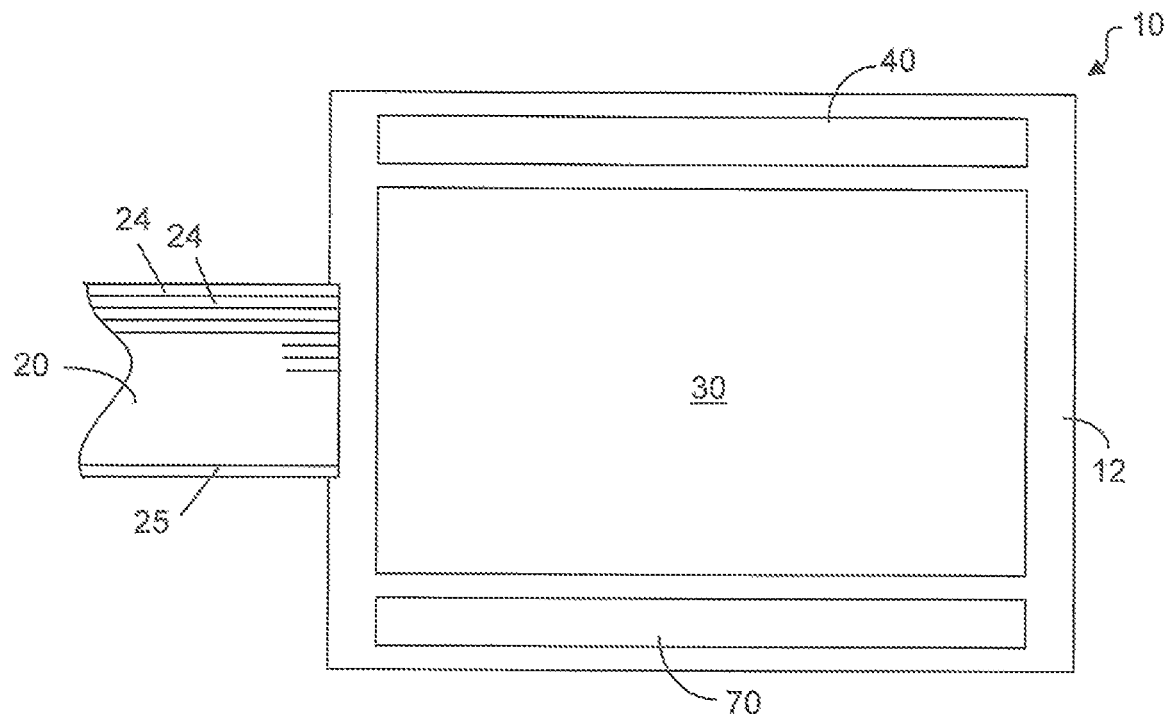
FIG. 2 illustrates a display device, according to an embodiment of the present invention.

FIG. 2 illustrates a display device, according to an embodiment of the present invention. As seen in FIG. 2, the display device 10 has a substrate 12, a display area 30, one or more control circuits 40, 70 configured to receive signals from a plurality of connection lines 24, 25 in a connecting cable 20, which can be a flexible printed circuit, or FPC, for example. The first control circuit 40 is referred to as a V-circuit and the second control circuit 70 is referred to as an H-circuit for their functions. The substrate 10 can be made of glass or any suitable material. As discussed below in conjunction with FIG. 7, digital signals are received from the connection lines 24 and reference signals are received from the connection lines 25 in the connecting cable 20.

Figure 4:
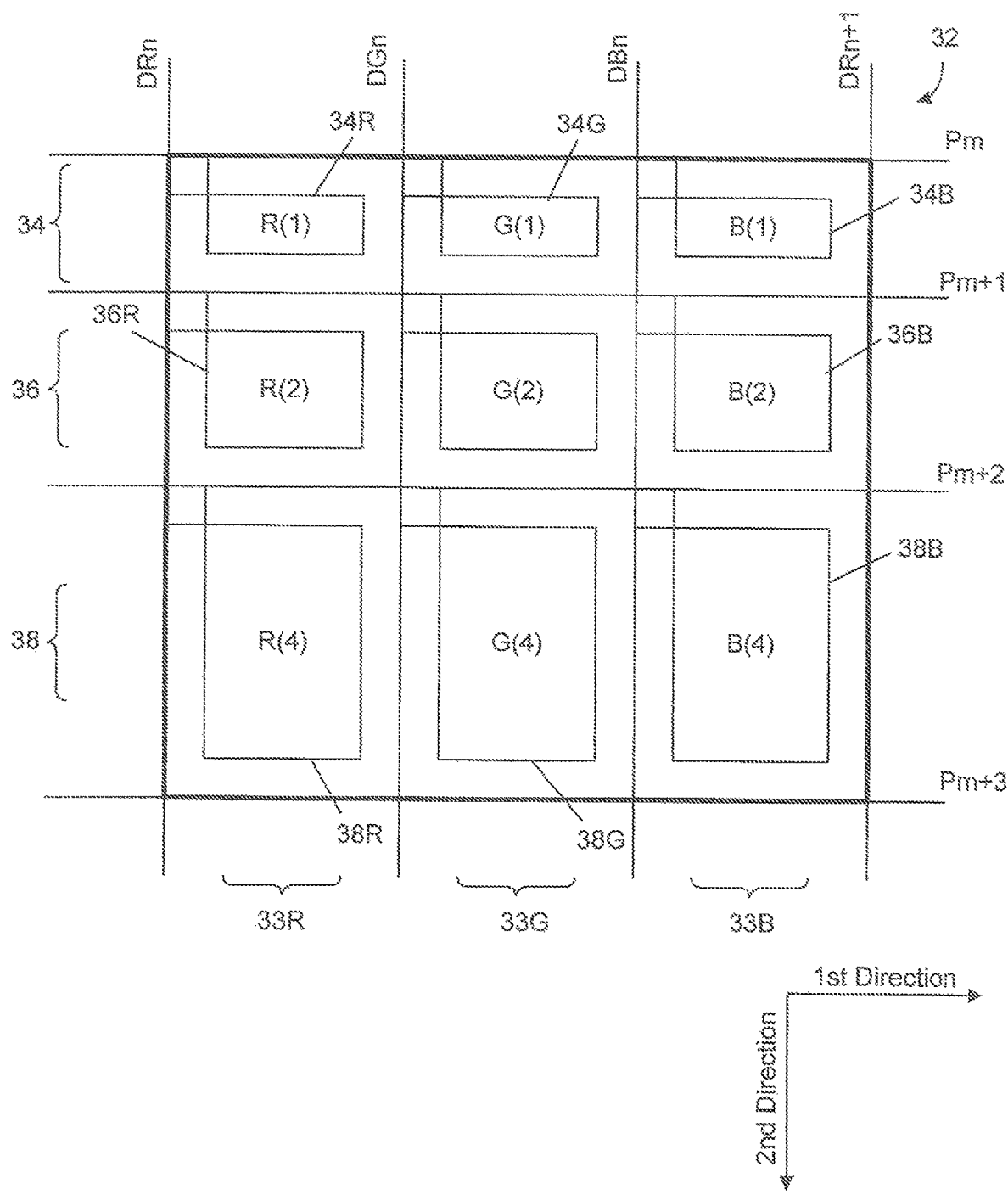
FIG. 4 illustrates a pixel on the display area, according to an embodiment of the present invention.

The display area 30 comprises a plurality of pixels 32 arranged in a two dimensional array in a first direction and a second direction (see FIG. 4).

Figure 3:
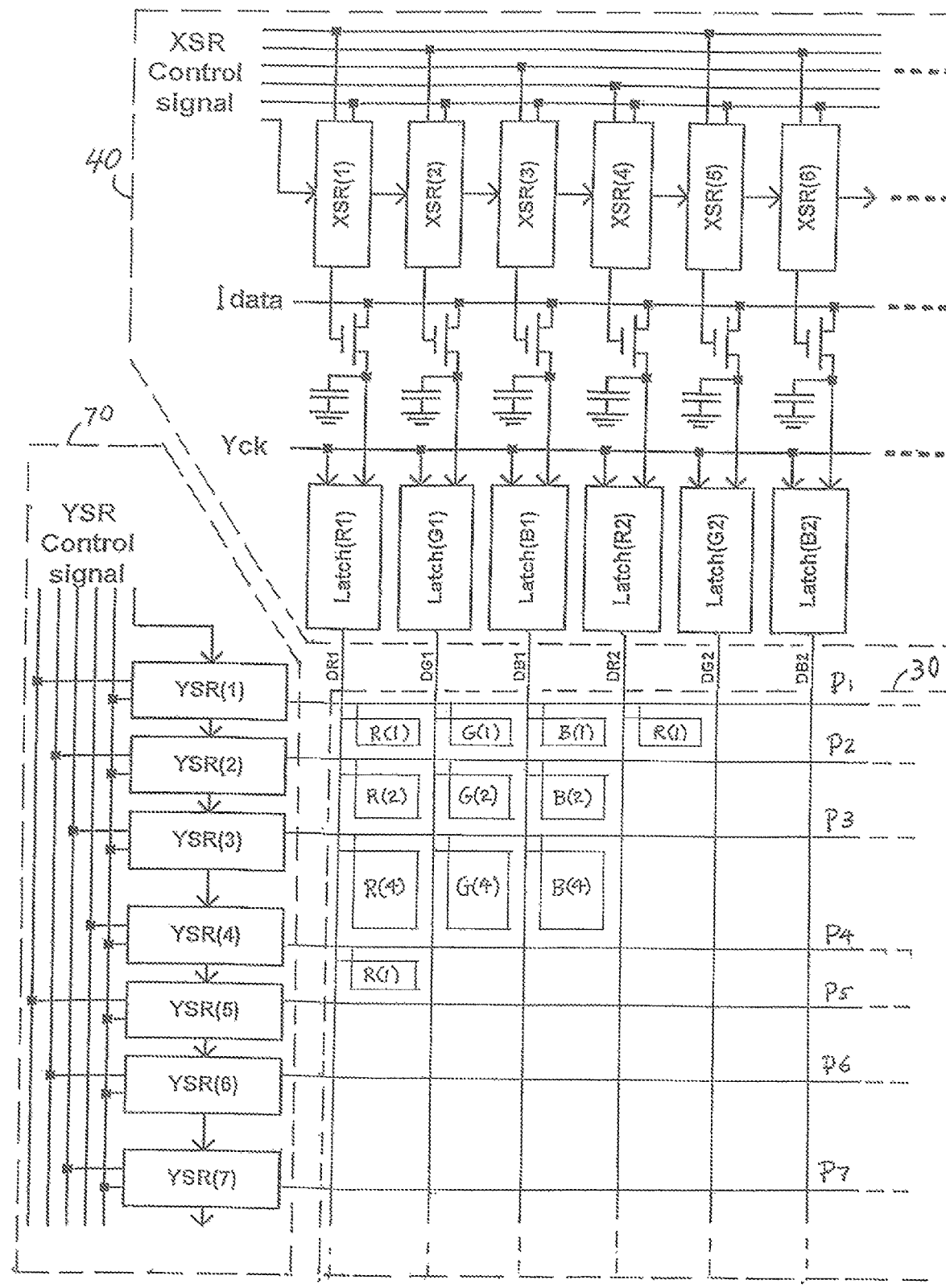
FIG. 3 illustrates the control circuits that control and provide image data to the display area, according to an embodiment of the present invention.

As seen in FIG. 3, the V-circuit 40 comprises a plurality of first control signal lines (XSR control signal lines), a data signal line (Idata) and a latch signal line (Yck); a plurality of first shift registers (XSR(1), XSR(2), . . . ) electrically connected to the first control signal lines, an image data receiving circuit electrically connected to the first shift registers and the data signal line; a plurality of latches (Latch(R1), Latch(G1), . . . ) electrically connected to the image data receiving circuit; and a plurality of data lines (DR1, DG1, . . . ) electrically connected to the latches for providing image data to the display area 30. The first shift registers, the image data receiving circuit and the latches comprise switching elements made of TFTs for controlling the image data. The first control signal lines, the data signal line and the latch signal line are together referred to as the first incoming signal lines. The first shift registers and latches are together referred to as the first electronic components.

The H-circuit 70 comprises a plurality of second control signal lines (YSR control signal lines), a plurality of second shift registers (YSR(1), YSR(2), . . . ) electrically connected to the second control signal lines and a plurality of scan lines (P1, P2, . . . ) electrically connected to the second shift registers for providing timing control signals to the pixels. The second shift registers comprise switching elements made of TFTs for controlling the timing control signals. The second control signal lines are also referred to as the second incoming signal lines and the second shift registers are also referred to as the second electronic components.

Figure 8:
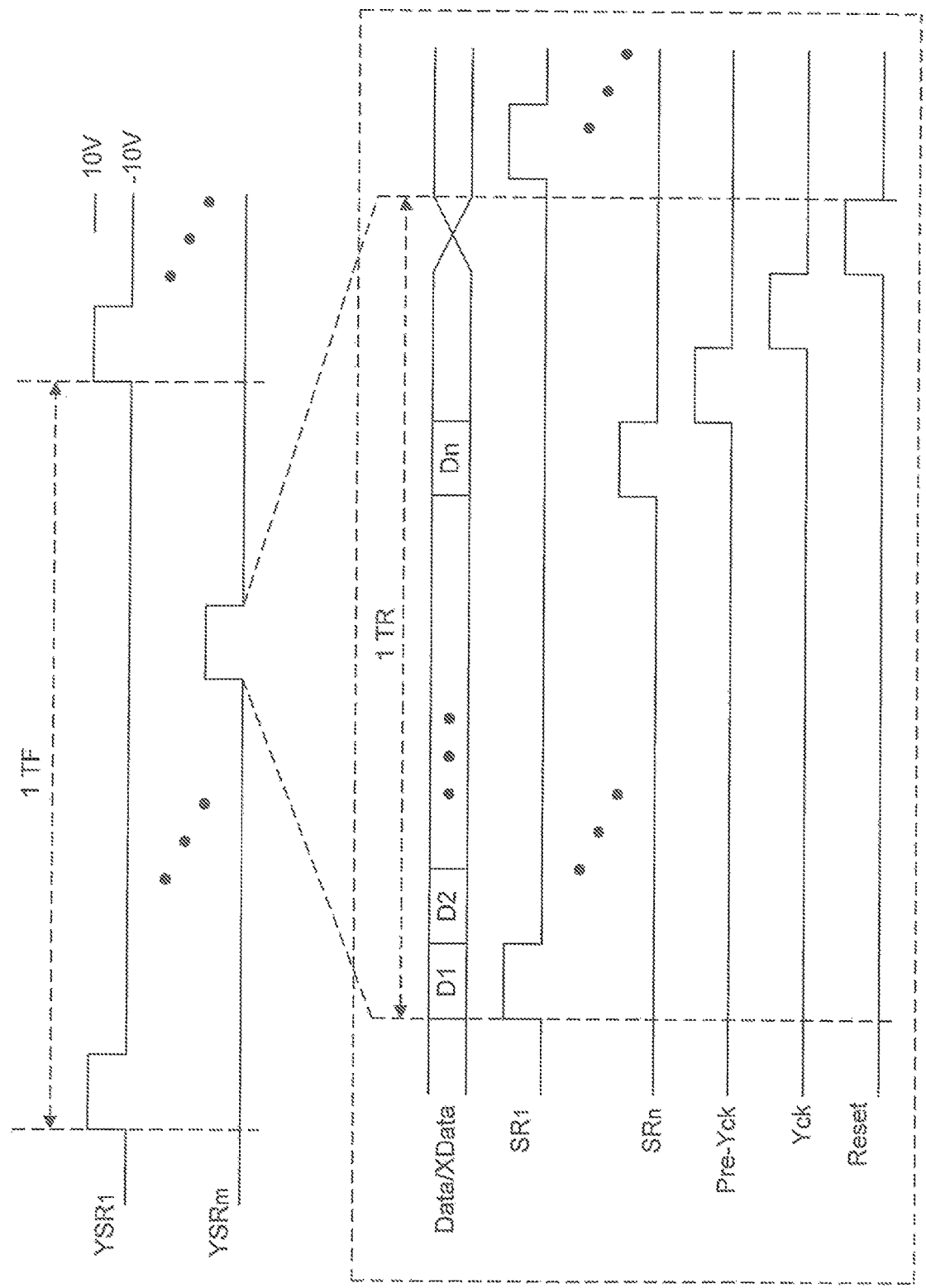
FIG. 8 is a time chart showing data and timing signals in the electronic circuit of FIG. 7.

According to an embodiment of the present invention, the first incoming signal lines and the second incoming signal lines are electrically connected to and configured to receive digital signals from the connection lines 24 of the connecting cable 20. The digital signals comprise data signals indicative of the image data and timing pulses indicative of the timing control signals. The timing of the data signals and the timing control signals are shown in FIG. 8.

As seen in FIG. 4, each of the pixels 32 has a plurality of color sub-pixels 33, such as a red sub-pixel 33R, a green sub-pixel 33G and a blue sub-pixel 33B arranged in the first direction. The pixel 32 can also be divided into a plurality of pixel sub-areas 34, 36 and 38, arranged in the second direction. In an embodiment of the present invention, the red sub-pixel 33R has three red sub-areas R(1), R(2), R(4), the green sub-pixel 33G has three green sub-areas G(1), G(2), G(4), and the blue sub-pixel 33B has three blue sub-areas B(1), B(2), B(4). The three blue sub-areas are denoted as first blue sub-area 34B, second blue sub-area 36B and third blue sub-area 38B; the three red sub-areas are denoted as first red sub-area 34R and so forth. Thus, the sub-areas in each of the red sub-pixel 33R, green sub-pixel 33G and blue sub-pixel 33B comprise a first sub-area, a second sub-area and a third sub-area. In an embodiment of the present invention, a third sub-area is two times larger than a second sub-area, and a second sub-area is two times larger than a first sub-area. For example, the sub-area R(4) is twice as large as the sub-area R(2), which is twice as large as R(1).

As seen in FIG. 4, the red sub-pixel 33R, the green sub-pixel 33G and the blue sub-pixel 33B are arranged to receive image data separately from data lines DRn, DGn and DBn. As the launching of image data into each of the pixel sub-areas 34, 36 and 38 is independent of other sub-areas, three scan lines Pm, Pm+1 and Pm+2 are used to provide gate signals to the switching elements in the sub-areas (not shown).

Figure 5:
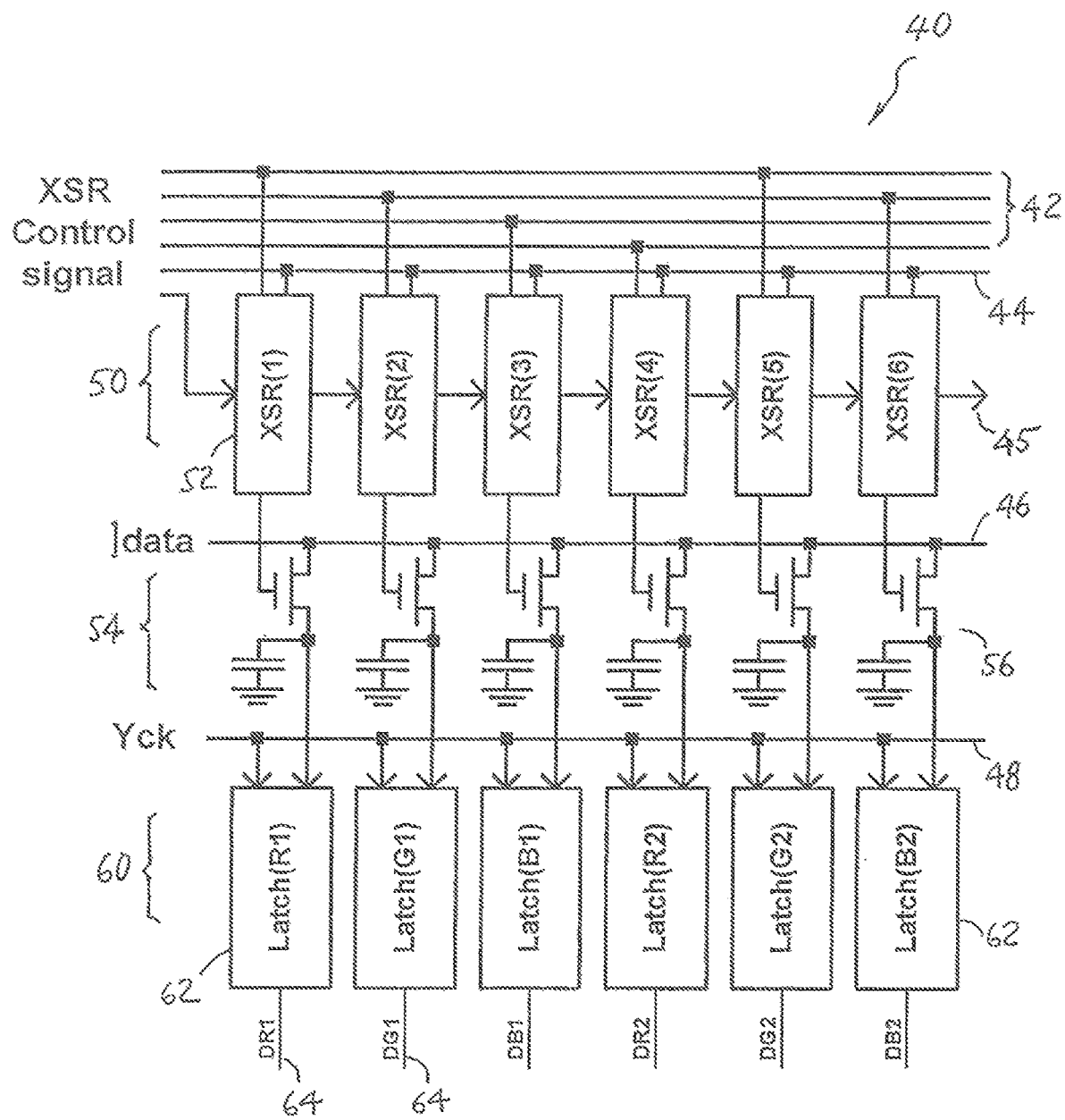
FIG. 5 illustrates a part of the electronic circuit that provides image data to the display area.

As seen in FIG. 5, the first control circuit 40 comprises a plurality of control signal lines 42, 44, a shift signal line 45, a data signal line 46 and a latch signal lines 48. These signal lines are electrically connected to the connection lines 24 of a connecting cable 20 (see FIG. 2). The first control circuit 40 further comprises a shift register array 50, an image data receiving circuit 54 and a latch array 60. The shift register array 50 is arranged to receive shift clock signals from the control signal lines 42, 44. The image data receiving circuit 54 is arranged to receive data signals indicative of image data from the data signal line 46. The latch array 60 is arranged to receive latch clock signals from the latch signal line 48. The latch array 60 comprises a plurality of latches 62. Each latch 62 is configured to provide image data to the pixels via a data line 64. The image data receiving circuit 54 comprises a plurality of image data receiving elements 56. Each image data receiving element 56 is configured to provide the image data based on the data signals received from the data signal line 46 to a corresponding latch 62. The shift register array 50 comprises a plurality of shift registers 52 electrically connected to the control signal lines 42, 44, wherein the control signal lines 42 are clock signal lines arranged to control the shifting of shift registers 52 with shifted pulses. The shifted pulses in the control signal lines 42 determine when the image signals from the data signal line 46 can be fed into the latches 62. The operation of feeding the image data in the first control circuit 40 repeats until all data (D1-Dn) are latched (see FIG. 8). The control signal line 44 is arranged to provide a reference voltage Vss (not shown) in each of the shift registers 52. Each of the shift registers 52 is electrically connected to an image data receiving element 56, which is electrically connected to a latch 62. Each of the shift registers 52 is configured to provide a control signal SRn (see FIG. 7) to the corresponding image data receiving element 56 in response to the shifted pulses in the control signal lines 42. The image data receiving element 56 is configured to provide the image data to the corresponding latch 62 in response to the control signal SRn. The latch 62 is electrically connected to a data line 64 and is configured to provide the image data to a column of color sub-pixels (see FIGS. 3 and 4) in response to the latch clock signals provided in the latch signal line 48. According to the present invention, the data signals provided by the data signal line 46 are digital signals received from one of the connection lines 24 in the connecting cable 20. In an embodiment of the present invention, the amplitude of the digital signals received from the connecting cable 20 is +10V or −10V (see FIG. 9). There is no need to use a driver IC to transform the digital signals into analog signals.

Figure 6:
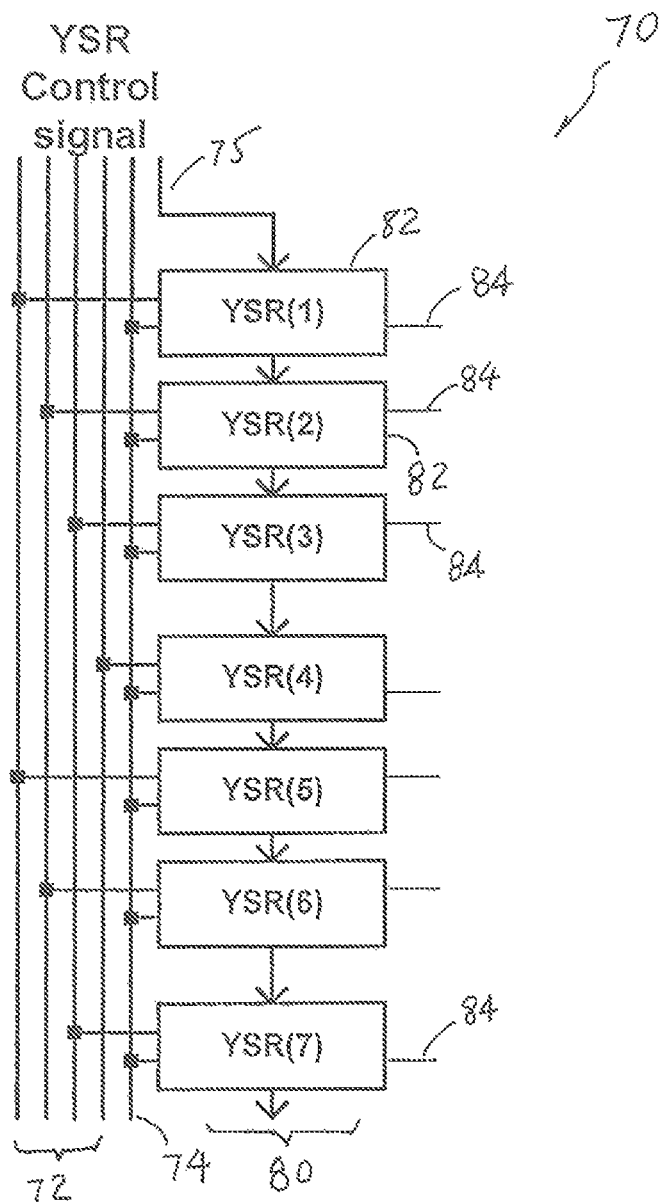
FIG. 6 illustrates a part of the electronic circuit that provides timing control signals to the display area.

As seen in FIG. 6, the second electronic circuit 70 comprises a plurality of control signal lines 72, 74 and a shift register array 80. The shift register array 80 comprises a plurality of shift registers 82 electrically connected to the control signal lines 72 and 74, wherein the control signal lines 72 are clock signal lines arranged to control the shifting of the shift registers 82 with shifted pulses. The control signal line 74 is arranged to provide a reference voltage Vss (not shown) in each of the shift registers 82. Each of the shift registers 82 is electrically connected to a scan line 84 and is configured to provide a gate pulse to a row of pixel sub-areas (see FIGS. 3 and 4) in response to the shifted pulses in the control signal lines 72.

Figure 7:
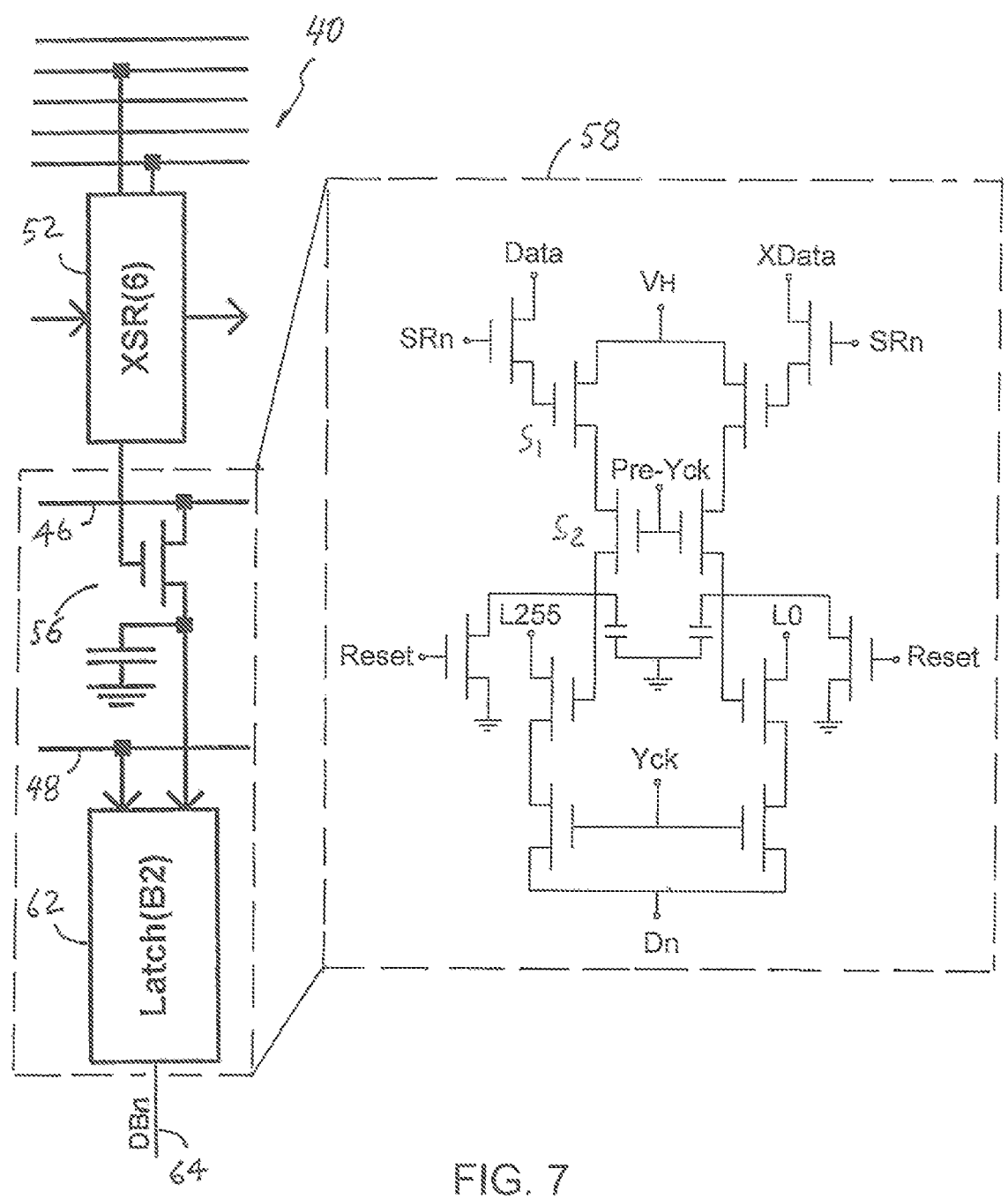
FIG. 7 illustrates an electronic circuit configured to carry out part of the image data receiving and latching functions of the electronic circuits.

FIG. 7 illustrates an electronic circuit 58 arranged to carry out the receiving and latching functions of an image data receiving element 56 and the corresponding latch 62, according to an embodiment of the present invention. In the electronic circuit 58, VH=6V, L0=−3V, L255=3V. These reference voltages or signals are provided by the connection cables 25 in the connecting cable 20 (see FIG. 2). L0 and L255 are used to control the bright/dark of the sub-areas 34, 36 and 38. The reference voltage L0 or L255 is supplied to the sub-areas through corresponding data lines (DR1, DG1, DB1, . . . ). Data and XData terminals are connected to data signal line 46 to receive data signals. The SRn terminals are connected to the output of the corresponding shift register 52. Dn is connected to a data line DRn. The Pre-Yck signal is the signal SRn+1 and the Reset signal is a shifted signal of Yck. As seen in FIG. 7, the electronic circuit 58 is composed mainly of a plurality of switching elements such as S1, S2. The switching elements in the latches 62, image data receiving elements 56, and shift registers 52 and 82 can be fabricated as a thin-film transistor (TFT). As each of the pixel sub-areas (34R, 36R, . . . ) is arranged to display image data in two levels in accordance with the states of the digital signals, the display device of the present invention does not have a driver IC to "drive" the pixel sub-areas. As such, the substrate area can be used in an optimal way. In FIG. 7, Data and XData are data signals received from the data signal line 46 which is electrically connected to one of the connection lines 24 of the connecting cable 20. The connection lines 24 are also referred to as control signal conductors, and the connection lines 25 are also referred to as reference signal conductors which are used to provide reference signals or voltages to the shift registers and latches.

FIG. 8 is a time chart showing data and timing signals in the electronic circuit of FIG. 7 in relation to the shifted pulses in the H-circuit 70. The time period between two adjacent YSRm shifted pulses (or gate pulsed) represents one frame time (TF) of the display area, and the pulse width of each of the shifted pulses YSRm is the time period provided to carry out the image data transfer in one row-time (TR) or when all the data (D1-Dn) are latched. For example, in a display area where pixels are arranged in a plurality of pixel rows and pixel columns, and each of the pixel rows comprises N color sub-pixels, the first control circuit (V-circuit 40) comprises N first shift registers and N latches, and the plurality of clock signal lines 42 are arranged to provide N shift clock signals and the latch signal line 48 is arranged N latch clock signals in a row-time period. Each of the timing pulses (shifted pulse YSRm) has a pulse width substantially equal to one row-time period.

In a display area where each of the pixel columns comprises M pixel sub-areas, the second control circuit (H-circuit 70) comprises M second shift registers and the second signal lines 72 are arranged to provide M consecutive timing pulses to the M second shift registers in one frame time. In an embodiment of the present invention, one frame time is 1/60 of a second, but can be smaller or greater than 1/60 of a second.

Figure 9:
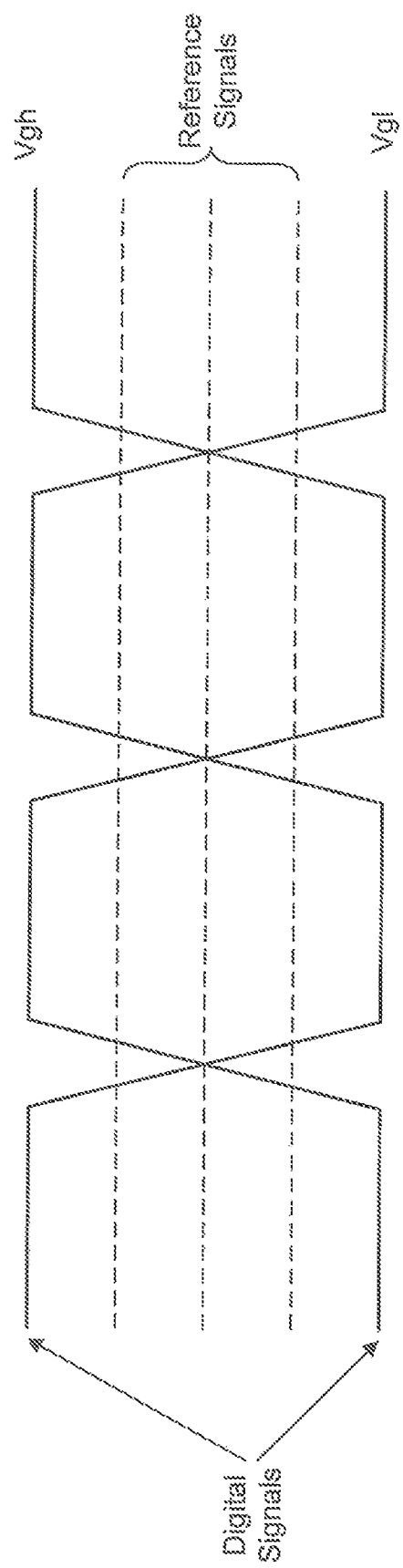
FIG. 9 is a graphical representation of digital signals and reference signals.

In an embodiment of the present invention, the reference voltage Vgh of the digital signals is equal to 10V and the reference voltage Vgl is equal to −10V. As seen in FIG. 9, the amplitude swing of the digital signals is much larger than the range of the reference signals. The voltage range of the reference signals is typically 0 to 6V.

Figure 10:
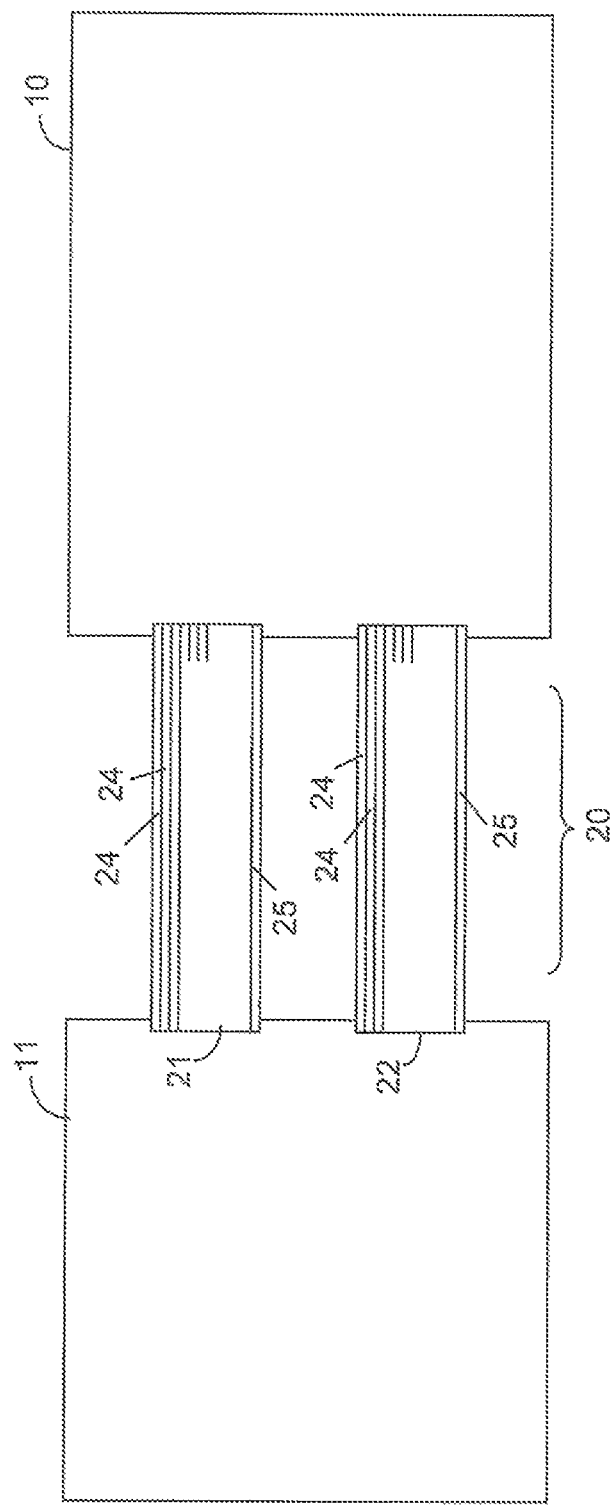
FIG. 10 illustrates the connection between the display device and a system that provides image data and timing control signals.

FIG. 10 illustrates the electronic connection between the display device and a system that provides image data and carries out timing control. As shown in FIG. 10, the display device 10 obtains data signals and timing control signals from a control system 11 via one or more connecting cables 20. For example, the connecting cables 20 comprise a flexible printed circuit (FPC) 21 and a flexible printed circuit 22. FPC 21 may include control signal conductors 24 electrically connected to the XSR control signal lines 42 and 44, data signal line 46, latch signal line 48, and reference signal conductors 25 to provide reference signals to the shift registers and latches in the V-circuit 40 (see FIG. 3). FPC 22 may include control signal conductors 24 electrically connected to the YSR control signal lines 72 and 74 and other reference signal conductors 25 to provide reference signals to the shift registers in the H-circuit 70 (see FIG. 3). Since the switching elements in control circuits 40, 70 are made of TFTs for shifting and latching purposes, the control circuits 40, 70 only require display information provided in digital signals and one or more reference signals (Vss, VH, LO, L255, Ground). According to the present invention, image-related information required for image display is carried only in digital signals, not in analog signals. There is no need to use driver ICs to process image-related information.

In summary, the display device of the present invention comprises a substrate and a display area disposed on the substrate. The display area comprises a plurality of pixels arranged in a two dimensional array. The display device further comprises one or more control circuits disposed on the substrate, the control circuits having electronic components configured to provide image data to the pixels and to control the timing in latching the image data. The control circuits are arranged to receive digital signals indicative of image data and timing pulses directly from a connecting cable.

What is claimed is:

1. A display device having a substrate and a display area disposed on the substrate, the display area comprising a plurality of pixels arranged in a two-dimensional array, said display device comprising:

a first control circuit disposed on the substrate, the first control circuit comprising a plurality of first incoming signal lines, a plurality of first electronic components, and a plurality of data lines, the data lines arranged to provide image data to the pixels, the first electronic components configured to receive from the first incoming signal lines data signals indicative of the image data;

a second control circuit disposed on the substrate, the second control circuit comprising a plurality of second incoming signal lines, a plurality of second electronic components and a plurality of scan lines, the scan lines arranged to provide timing control signals to the pixels, the second electronic components configured to receive from the second incoming signal lines timing pulses indicative of the timing control signals; and a connecting cable comprising a plurality of first connection lines and a plurality of second connection lines, wherein the first incoming signal lines are electrically connected to the first connection lines to receive the data signals therefrom, and the second incoming signal lines are electrically connected to the second connection lines to receive the timing pulse therefrom, and wherein the data signals are digital signals, the digital signals having an amplitude range, wherein the connecting cable is further configured to provide reference signals for controlling the image data in the first control circuit and controlling the timing signals in the second control circuit, the reference signals having a signal voltage range, wherein the amplitude range of the digital signals is greater than the signal voltage range of the reference signals.

2. The display device according to claim 1, wherein the first incoming signal lines comprise a data signal line for providing the data signals to the first electronic components.

3. The display device according to claim 1, wherein each of the pixels comprises a plurality of color sub-pixels, each color sub-pixel arranged to receive the image data from a different one of the data lines, and wherein each color sub-pixel comprises a plurality of color sub-areas, each color sub-area arranged to receive the timing control signals from a different one of the scan lines.

4. The display device according to claim 3, wherein the data lines comprise a first data line, a second data line and a third data line, and the color sub-pixels comprise a red sub-pixel, a green sub-pixel and a blue sub-pixel, the red sub-pixel comprising a plurality of red sub-areas arranged to receive the image data from the first data line, the green sub-pixel comprising a plurality of green sub-areas arranged in the first direction for receiving image data from the second data line, the blue sub-pixel comprising a plurality of blue sub-areas arranged to receive image data from the third data line.

5. The display device according to claim 4, wherein the sub-areas in each of the red sub-pixel, the green sub-pixel and the blue sub-pixel comprise a first sub-area, a second sub-area and a third sub-area, wherein the third sub-area is two times larger than the second sub-area and the second sub-area is two times larger than the first sub-area.

6. The display device according to claim 1, wherein each pixel comprises a plurality of pixel sub-areas, each of the pixel sub-areas arranged to receive the timing control signals from a different scan line, each pixel sub-area comprising a red sub-area, a green sub-area and a blue sub-area.

7. The display device according to claim 3, wherein the first electronic components comprise a plurality of first shift registers and a plurality of latches configured to control the image data, and wherein the first incoming signal lines comprise a plurality of control signal lines arranged to provide shift clock signals and latch clock signals, the first shift registers configured to provide the data signals to the latches in response to the shift clock signals, the latches configured to provide the image data to the color sub-pixels in response to the latch clock signals.

8. The display device according to claim 3, wherein the second electronic components comprise a plurality of second shift registers configured to control the timing control signals, the second incoming signal lines arranged to provide shift clock signals, the second shift registers configured to provide the timing pulses to the color sub-areas in response to the shift clock signals.

9. The display device according to claim 1, wherein the pixels are arranged in a plurality of pixels rows in the first direction and a plurality of pixel columns in the second direction, and wherein each pixel comprises a plurality of pixel sub-areas arranged in the second direction, each of the pixel sub-areas arranged to receive the timing control signals from a different scan line, and wherein each pixel sub-area comprises a plurality of color sub-areas arranged in the first direction, each color sub-area arranged to receive the image data from a different data line.

10. The display device according to claim 9, wherein the plurality of color sub-areas comprise red sub-areas, green sub-areas and blue sub-areas, and wherein each pixel comprises a plurality of color sub-pixels, including a red sub-pixel having the red sub-areas, a green sub-pixel having the green sub-areas and a blue sub-pixel having the blue sub-areas, and wherein the first electronic components comprise a plurality of first shift registers and a plurality of latches configured to control the image data, and the first incoming signal lines comprise a plurality of control signal lines arranged to provide first shift clock signals and latch clock signals, the first shift registers configured to provide the data signals to the latches in response to the first shift clock signals, the latches configured to provide the image data to the color sub-pixels in response to the latch clock signals.

11. The display device according to claim 10, wherein the second electronic components comprise a plurality of second shift registers configured to control the timing control signals, the second incoming signal lines arranged to provide second shift clock signals, the second shift registers configured to provide the timing pulses to the color sub-areas in response to the second shift clock signals.

12. The display device according to claim 11, wherein each of the pixel rows comprises N color sub-pixels, N being a positive integer greater than one, wherein the first electronic components comprise N first shift registers and N latches, wherein the plurality of control signal lines arranged to provide N shift clock signals and N latch clock signals in a row-time period, and wherein each of the timing pulses has a pulse width substantially equal to one row-time period.

13. The display device according to claim 12, wherein each of the pixel columns comprises M pixel sub-areas, M being a positive integer greater than one, wherein the second electronic components comprise M second shift registers and the second incoming signal lines are arranged to provide M consecutive second shift clock pulses to the M second shift registers in one frame time.

14. The display device according to claim 13, wherein said one frame time is equal to 1/60 of a second.

15. The display device according to claim 1, wherein the substrate comprises a glass substrate.

16. The display device according to claim 1, wherein the connecting cable comprises one or more flexible printed circuits arranged to receive the data signals and the timing pulses from a control system.

17. The display device according to claim 1, wherein the digital signals comprise a first voltage level and a second voltage level, wherein the first voltage level is substantially equal to 10V and the second voltage level is substantially equal to −10V.

18. The display device according to claim 1, wherein
the first electronic components comprise a plurality of first switching elements for controlling the image data, and
the second electronic components comprise a plurality of second switching elements for controlling the timing control signals, wherein the first and second switching elements are solely made of thin-film transistors.

19. The display device according to claim 18, wherein the reference signals are arranged to provide a voltage reference to some of the first and second switching elements, wherein the signal voltage range is between −3V to 6V.

20. The display device according to claim 7, wherein each of first shift registers and latches comprises a plurality of switching elements made of thin-film transistors.

\* \* \* \* \*